United States Patent
Cheng et al.

(10) Patent No.: US 10,091,675 B2
(45) Date of Patent: Oct. 2, 2018

(54) SYSTEM AND METHOD FOR ESTIMATING AN EFFECTIVE BANDWIDTH

(71) Applicant: Huawei Technologies Co., Ltd., Shenzhen (CN)

(72) Inventors: Ho Ting Cheng, Stittsville (CA); Hang Zhang, Nepean (CA); Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 677 days.

(21) Appl. No.: 13/920,764

(22) Filed: Jun. 18, 2013

(65) Prior Publication Data

US 2014/0169192 A1 Jun. 19, 2014

Related U.S. Application Data

(60) Provisional application No. 61/736,978, filed on Dec. 13, 2012.

(51) Int. Cl.
*H04W 24/08* (2009.01)

(52) U.S. Cl.
CPC .................................. *H04W 24/08* (2013.01)

(58) Field of Classification Search
None
See application file for complete search history.

(56) References Cited

U.S. PATENT DOCUMENTS 6,216,006 B1 * 4/2001 Scholefield et al. .......... 455/450
7,203,169 B1   4/2007 Okholm et al.
2006/0072620 A1 * 4/2006 Chatterjee ..................... 370/477
2006/0187836 A1 * 8/2006 Frey et al. ..................... 370/235
2008/0247357 A1 * 10/2008 Kim et al. ..................... 370/329
2009/0224801 A1 * 9/2009 Lewin ............................. 326/52
2013/0294234 A1 * 11/2013 Thapliya et al. .......... 370/230.1

FOREIGN PATENT DOCUMENTS

| CN | 1741467 A | 3/2001 |
| CN | 101060474 A | 10/2007 |
| EP | 0940952 A2 | 9/1999 |

OTHER PUBLICATIONS

Nguyen, et al., "A Survey of Techniques for Internet Traffic Classification using Machine Learning," IEEE Comm. Surv. & Tut., vol. 10, No. 4, Nov. 2008, pp. 56-76.
International Search Report and Written Opinion, International Application No. PCT/CN2013/087667, dated Mar. 6, 2014, 12 pages.

* cited by examiner

*Primary Examiner* — Jae Y Lee
*Assistant Examiner* — Alan Lindenbaum
(74) *Attorney, Agent, or Firm* — Slater Matsil, LLP

(57) ABSTRACT

In one embodiment, a method for a method of estimating an effective bandwidth of a traffic source includes obtaining a first traffic pattern from a first traffic source. Also, the method includes setting a first effective bandwidth between a mean data rate of the first traffic source and a peak data rate of the first traffic source. Additionally, the method includes determining a first outage rate of the first traffic source in accordance with the first traffic pattern and the first effective bandwidth.

27 Claims, 15 Drawing Sheets

SYSTEM AND METHOD FOR ESTIMATING AN EFFECTIVE BANDWIDTH

This application claims the benefit of U.S. Provisional Application Ser. No. 61/736,978 filed on Dec. 13, 2012, and entitled "System and Method for Estimating an Effective Bandwidth," which application is incorporated herein by reference.

TECHNICAL FIELD

The present invention relates generally to telecommunications service network technology, and particularly to a system and a method for estimating an effective bandwidth.

BACKGROUND

In a telecommunications service network, traffic may be classified by traffic type. For example, in an asynchronous transfer mode (ATM), network there are different classes of traffic, such as constant bit rate (CBR) traffic, variable bit rate (VBR) traffic, available bit rate (ABR) traffic, and unspecified bit rate (UBR) traffic. Traffic may be characterized for purposes of admission control, traffic shaping and management, and/or packet scheduling. Different classes of traffic may have a particular set of quality of service (QoS) requirements and traffic characteristics.

QoS is the ability to provide different priority to different applications, users, or data flows, or to guarantee a certain level of performance to a data flow. Requirements included in QoS are requirements for all aspects of a connection, including service response time, loss, signal-to-noise ratio, cross-talk, echo, interrupts, frequency response, loudness, and other requirements. A certain level of performance may be guaranteed. These QoS guarantees may be important if the network capacity is insufficient. In packet switched networks, QoS is affected by human factors, such as stability of service, availability of service, delays and user information. Also, QoS is affected by technical factors such as reliability, scalability, effectiveness, maintainability, and grade of service.

SUMMARY OF THE INVENTION

In accordance with an embodiment, a method of estimating an effective bandwidth of a traffic source includes obtaining a first traffic pattern from a first traffic source. Also, the method includes setting a first effective bandwidth between a mean data rate of the first traffic source and a peak data rate of the first traffic source. Additionally, the method includes determining a first outage rate of the first traffic source in accordance with the first traffic pattern and the first effective bandwidth.

In a further embodiment a gateway includes a processor and a computer readable storage medium storing programming for execution by the processor. The programming includes instructions to obtain a traffic pattern from a traffic source and set an effective bandwidth between a mean data rate of the traffic source and a peak data rate of the traffic source. The programming also includes instructions to determine an outage rate of the traffic source in accordance with the traffic pattern and the effective bandwidth.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
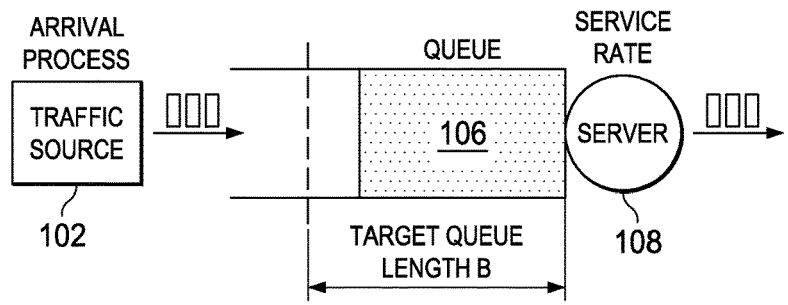
FIG. 1 illustrates components in traffic characterization.

Different classes of traffic have different sets of QoS requirements and different traffic characteristics. FIG. 1 illustrates components in a traffic characterization. Traffic source 102, for example an application, generates a data stream, which is queued in source buffer 106. Then, server 108 transmits the data stream in source buffer 106. Because of traffic fluctuations, some data may not be transmitted by its delay bound, or source buffer 106 may overflow from a sudden increase in the amount of incoming data. In an example, traffic source 102 specifies a target QoS threshold such as the buffer overflow or delay bound violation under which the quality of user experience will not be greatly affected. When the peak data rate is used, the system may be underutilized. However, when the mean data rate is used, there will likely be service dissatisfaction. Further a particular level of QoS guarantee cannot easily be achieved by using an arbitrary data rate.

Figure 2:
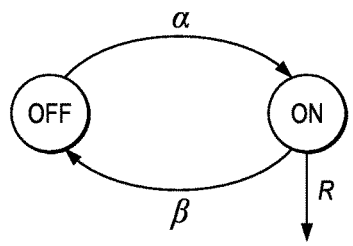
FIG. 2 illustrates an on/off traffic model.
Figure 3:
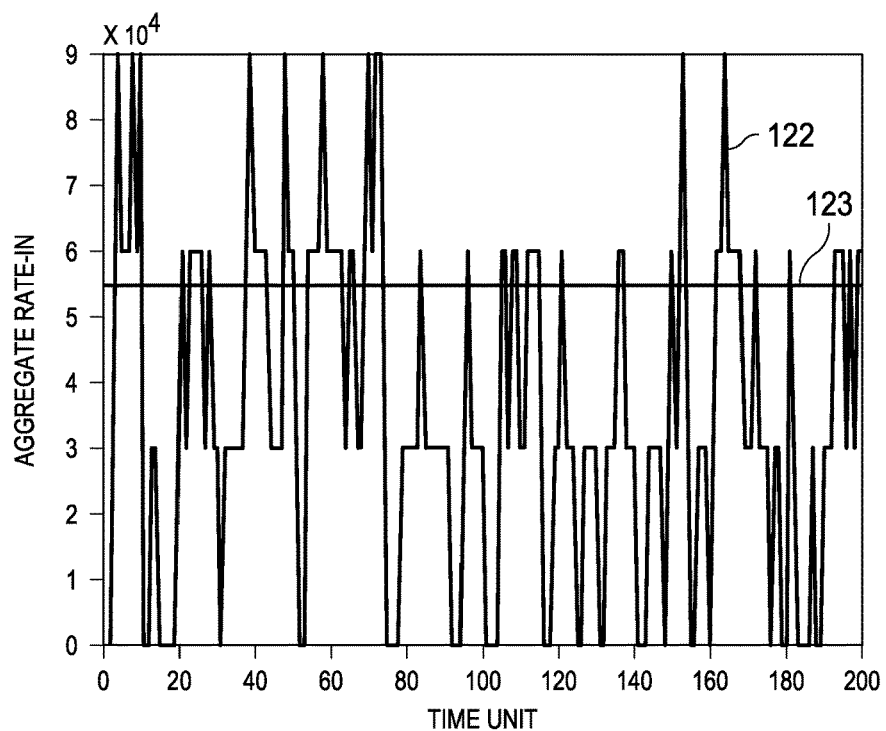
FIG. 3 illustrates an aggregate traffic pattern of a traffic source.

An effective bandwidth can be used to determine the required service rate to satisfy the QoS requirements of a traffic source. The effective bandwidth is the minimum average data rate required to satisfy the QoS requirement of a traffic source, for example a 5% outage rate due to re-buffering. FIG. 2 illustrates a theoretical on/off model of a traffic source, where the effective bandwidth is given by:

$$eb(x) = \left(\frac{R}{2} - \frac{\alpha+\beta}{2x}\right) + \sqrt{\left(\frac{R}{2} - \frac{\alpha+\beta}{2x}\right)^2 + \frac{\alpha R}{x}}$$

where $\alpha$ is the transition time from off to on, $\beta$ is the transition time from on to off, and x is given by:

$$x = -\frac{1}{cD}\log P(\text{Delay} > D),$$

where D is the maximum delay, P(Delay>D) is the target outage rate of any packet in the queue experiencing delay more than D, and c is the service rate of the queue, or the effective bandwidth. There is a target outage of the traffic source because there is an outage rate where quality of user experience (QoE) remains relatively unchanged. For the on/off traffic model, FIG. 3 illustrates an example of an aggregate traffic pattern of three on/off traffic sources, where curve 122 is the aggregate rate and curve 123 is the effective bandwidth.

A particular user application could be admitted to the system using a prior agreement or on an on-demand basis. The user may indicate its application type which may have certain quality of service (QoS) or QoE requirements. The initial negotiation for on-demand admission may depend on an initial estimate of the effective bandwidth the system has for that application's traffic. The system (service provider or the network owner) may have a stored database where the user application and/or service requirements are mapped to a certain effective bandwidth. This database may be user based.

In an example where there is a prior agreement, a negotiation process may not happen. However, with both on-demand admission and a prior agreement, the system estimates resource requirements for network management functions, such as admission control, routing, and resource reservation. The initial estimate of resource requirement may also be performed based on the effective bandwidth of this application for this user stored in the database. When this application is a new application, and no record is found depending on the application tag or specified QoS requirements, a conservative value is used initially, and the actual rate requirement is measured.

The same application may have a different effective bandwidth depending on the user or the specific characteristics of that application, but there may be several sub traffic classes within the same application. In that case, the system may first assess a conservative effective bandwidth based on the previous mapping of traffic characteristics, and continue to assess the traffic to map an accurate effective bandwidth value, and if necessary define a new traffic subclass. This new classification may be informed to the users for future needs. The information of effective bandwidth of this subclass or a related parameter such as an associated cost may also be informed to the user.

Figure 4:
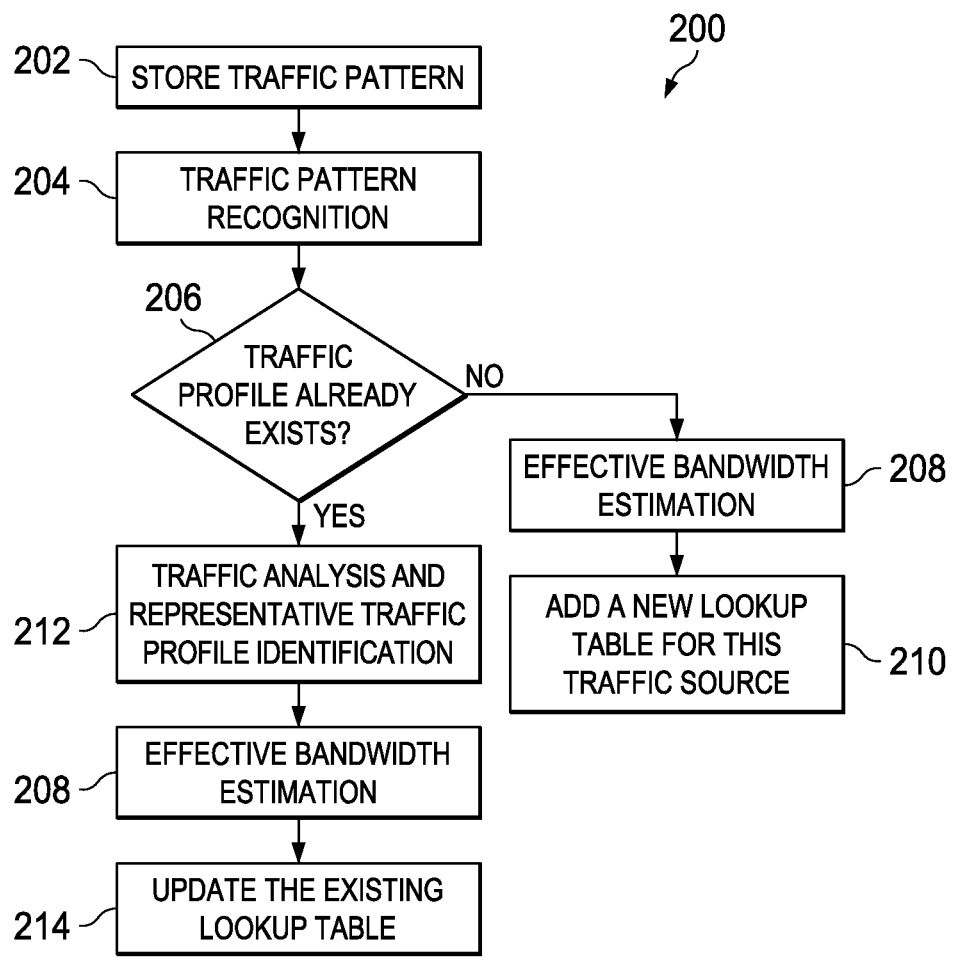
FIG. 4 illustrates a flowchart for an embodiment method of estimating an effective bandwidth.

Flowchart 200 in FIG. 4 illustrates a method for estimating an effective bandwidth. Initially, in step 202, all or part of a traffic pattern of a traffic source is recorded. The traffic pattern is obtained, for example by acquiring the traffic pattern or guessing the traffic pattern. When the traffic source is a downstream traffic source, the trace of the traffic pattern is recorded at a RAN gateway and stored in a database in the RAN gateway. However, when the traffic source is an upstream traffic source, at the end of an application session, the system may signal a user equipment (UE) to report the trace of the traffic pattern, and the UE is scheduled to send the trace of the traffic pattern to the system, which is then stored in a database. Alternately, the trace of the traffic pattern is a text file. For example, the trace of traffic pattern may include packet type, the packet arrival time, the packet size, and other packet characteristics. In an example, the trace of the traffic pattern includes an entire video stream with a vector containing the frame type, number of bits, and a timestamp. In other examples, the trace of the traffic pattern includes the average of the arrival over a window, such as 1 ms, or a weighted average. Alternately, the trace of the traffic source may include information of periodically selected frames, for example odd numbered frames only, even numbered frames only, or every certain number of frames, such as every six frames.

Next, in step 204, the traffic pattern is recognized. Recognizing the traffic pattern may include traffic classification, such as pattern recognition, feature identification, or machine learning may be used. Alternately, deep packet inspection may be used to obtain an application identifier, or tag identifiers may identify the traffic, for example as news, entertainment, and sports. On the other hand, changing standards and/or QoS categories may allow for more traffic categories. Step 204 may include calculated the mean data rate, the peak data rate, and other statistics.

Then, in step 206, it is determined whether the traffic pattern matches a previously recorded traffic pattern. There are a variety of methods that may be used to determine whether a traffic pattern matches a previously recorded traffic pattern. Finding a match may be performed based on application tags, the traffic ID in the agreed upon traffic classification, or based on statistics such as first order, second order, and autocorrelation functions.

When the traffic pattern does not match a previously recorded traffic pattern, the effective bandwidth of the traffic pattern is then estimated in step 208, and in step 210, a new lookup table for this traffic source is added. Step 210 may include applying a curve fitting technique to determine the relationship between the effective bandwidth and the corresponding outage rate. However, when the traffic pattern does match a previously recorded traffic patter, traffic analysis and representative traffic profile identification is performed in step 212. Then, the effective bandwidth is estimated in step 208, and the existing lookup table is then updated in step 214.

Figure 5:
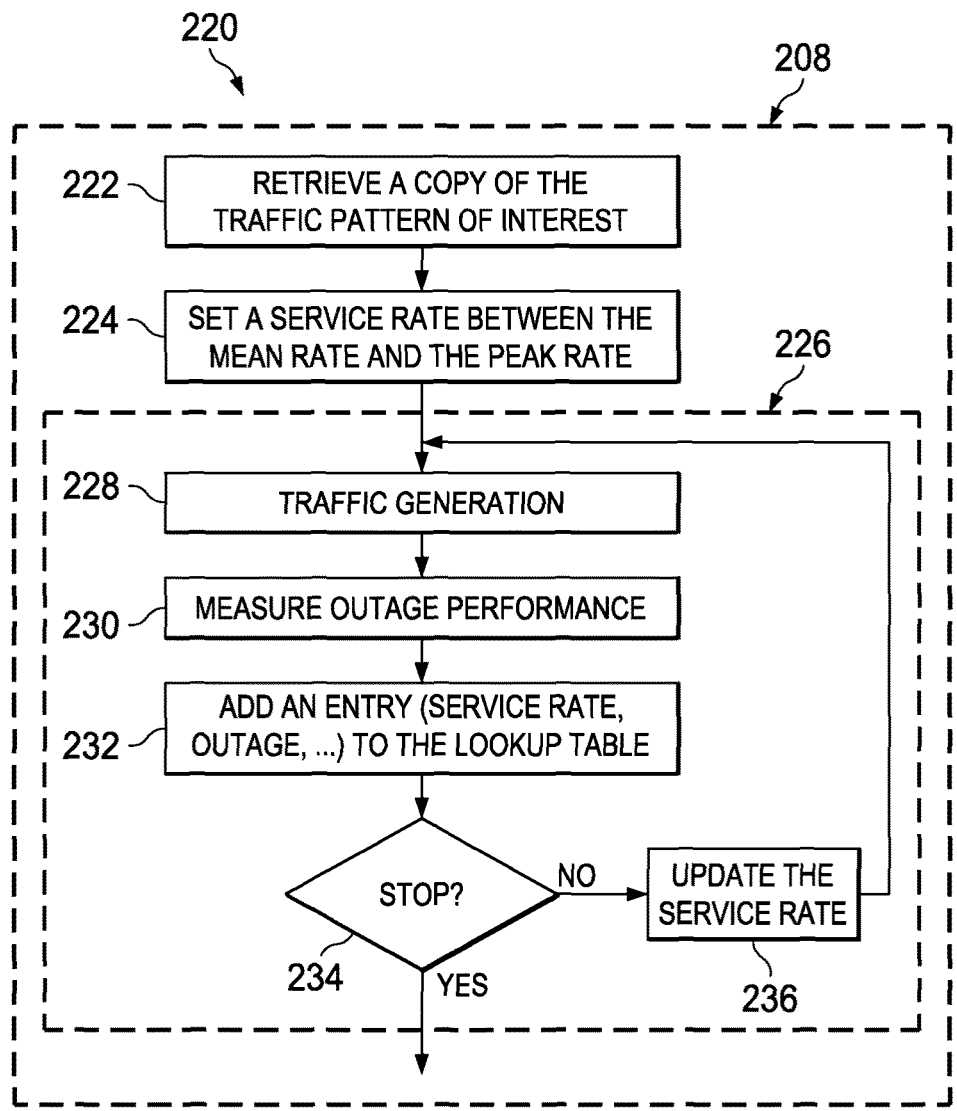
FIG. 5 illustrates a flowchart for another embodiment method of estimating an effective bandwidth.

FIG. 5 illustrates flowchart 220 for estimating the effective bandwidth in step 208. Initially, in step 222, a copy of the traffic pattern of interest is retrieved from the database. Then, in step 224, the effective bandwidth is set to a rate between the mean data rate and the peak data rate. Next, the outage rate is determined in step 226, which may run in the background. In step 226, first the traffic is generated in step 228. After step 228, the outage rate is measured in step 230, for example the total time where outages occur may be measured over the service duration. Then, in step 232, the effective bandwidth and measured outage rate are added to the database. Step 234 determines whether step 226 will be performed again. When the outage rate will be determined again, the effective bandwidth is updated by adding a delta, where delta is a real number which may be configurable, in step 236, and steps 228, 230, 232, and 234 are repeated, while when outage rate will not be determined again, the simulation ends.

Figure 6:
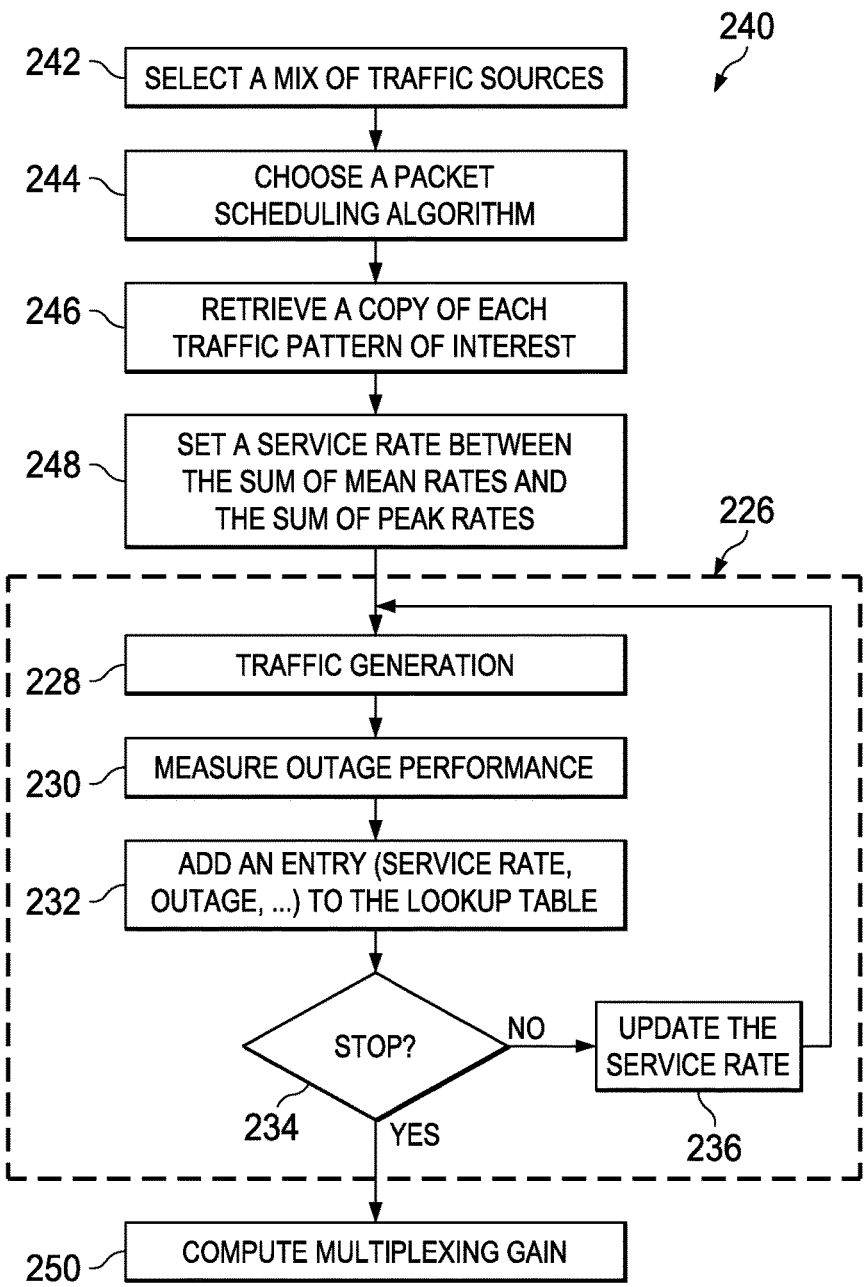
FIG. 6 illustrates a flowchart for an embodiment method of determining a multiplexing gain.

Flowchart 240 for estimating the traffic multiplexing gain is illustrated in FIG. 6. Because the sum of the effective bandwidths of individual traffic sources is larger than the effective bandwidth of a traffic mix of the traffic sources, the multiplexing gain can be calculated by comparing the effective bandwidth of the traffic mix to the sum of the effective bandwidths of the individual traffic sources. Initially, in step 242, a desired mix of traffic sources is selected, for example a popular traffic mix may be selected. Then, in step 244, a packet scheduling algorithm, such as weighted fair queuing, is used. In other examples, other packet scheduling algorithms may be used. Different scheduling algorithms may result in an outage rate given the same value of an effective bandwidth, since the time window over which an effective bandwidth can be achieved might be different for different scheduling algorithms. Next, in step 246, a copy of each traffic pattern in the selected traffic mix is retrieved from a database, and the effective bandwidth is preliminarily set in step 248 to a rate between the sum of the mean data rates and the sum of the peak data rates. After step 248, the effective bandwidth of the traffic mix is estimated in step 226, for example using step 226 illustrated in FIG. 5. Finally, in step 250, the traffic multiplexing gain is calculated by subtracting the effective bandwidth of the traffic mix from the sum of the effective bandwidths of individual traffic sources. Also in step 250, the multiplexing gain is stored in the database.

Steps 246, 248, 226, and 250 may be repeated for a different set of target outage rates until a desired lookup table has been generated.

Figure 7:
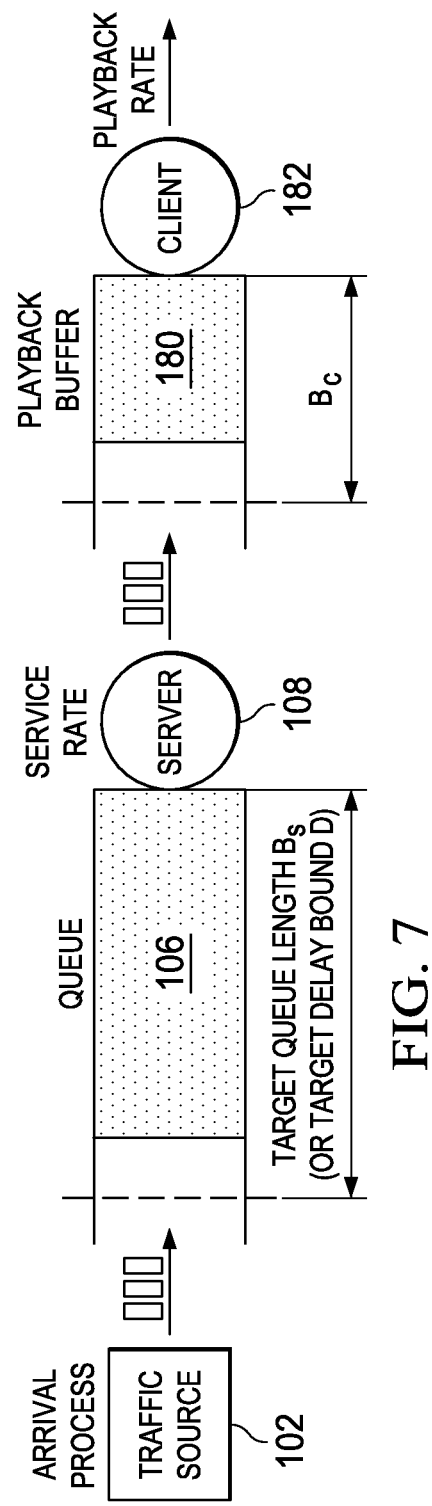
FIG. 7 illustrates components in traffic characterization in the presence of a playback buffer.

In applications where there is a playback buffer at the client side, the outage performance of the application includes the outage performance in terms of a delay bound violation and/or buffer overflow at the source, or the outage performance from re-buffering at the client, or both. FIG. 7 illustrates components in traffic characterization in the presence of a playback buffer. As in FIG. 1, traffic source 102 generates a data stream which is queued into source buffer 106, and server 108 transmits the data stream in source buffer 106. Then, the data stream goes into playback buffer 180, and client 182 outputs the data stream at the playback rate.

Figure 8:
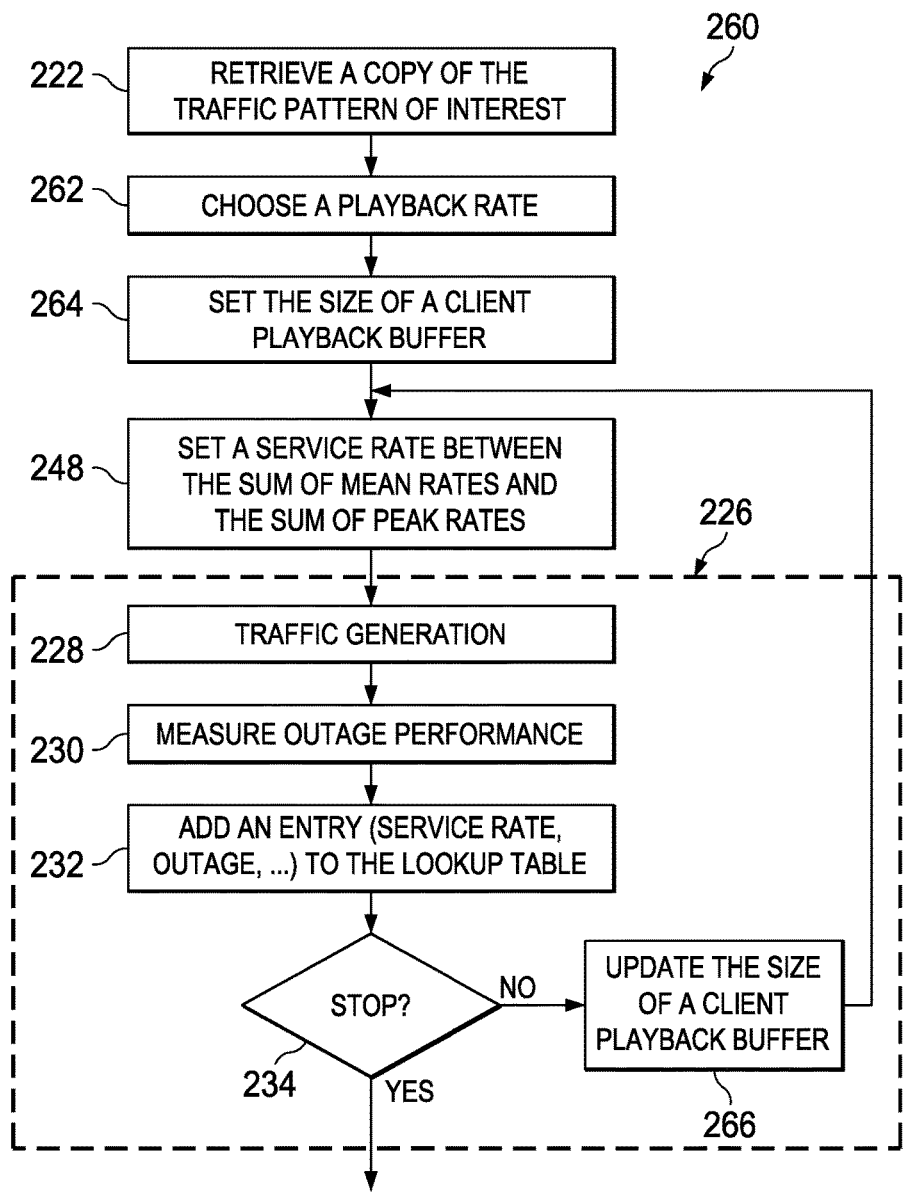
FIG. 8 illustrates a flowchart for an embodiment method of estimating an effective bandwidth in the presence of a playback buffer.

The estimation of an effective bandwidth in the presence of a client playback buffer is illustrated in FIG. 8 by Flowchart 260. Initially, in step 222, a copy of the traffic pattern of interest is retrieved. Then, in step 262, a playback rate is selected. After step 262, the initial size of the client playback buffer (e.g., in seconds or in bits) is set in step 264. Next, in step 248, the effective bandwidth is preliminarily set between the sum of the individual mean data rates and the sum of the individual peak service rates, the effective bandwidth is estimated in step 226, and it is determined whether the stopping condition is met in step 234. When the stopping condition is met, the method is finished. However, when the stopping condition is not met, the initial size of the client playback buffer is updated in step 266, and steps 248, 226, and 234 are repeated.

In an example, the outage rate of the traffic source is a function of the scheduling. For example, the backoff margin may be added to or subtracted from the estimated effective bandwidth to account for the impact of scheduling, where the modified effective bandwidth could result in a different outage rate. In an example, the backoff margin is based on real-time feedback data, which may be an outage rate of a user, or it may be instantaneous traffic arrivals. When there are insufficient traffic realizations, a non-negative backoff margin can be introduced to the estimated effective bandwidth for admission, but a penalty such as a refund might be triggered when the measured QoS drops below the target. Also, when the packet generation for a traffic source is adaptive, for example when it is load dependent, such as dependent on the time of day, channel dependent, such as DASH, time varying, such as CDNs, or location dependent, such as with caches, the system can collect as many traffic realizations as possible with a particular configuration such that entries identify a typical traffic pattern of this traffic source. The system then performs admission based on the typical traffic pattern. A backoff margin may be introduced related to the estimation error.

Figure 9:
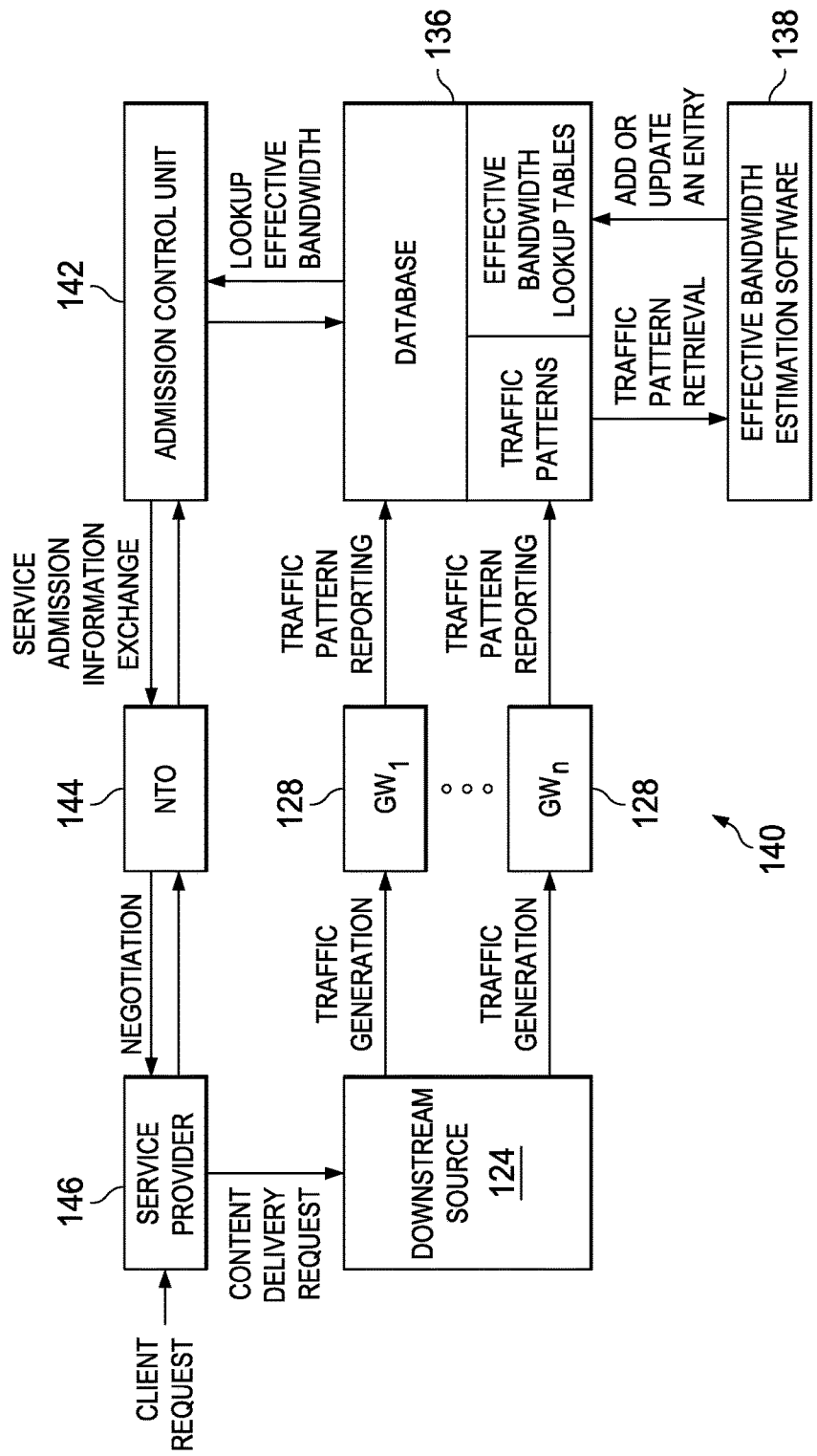
FIG. 9 illustrates an embodiment communications system for estimating an effective bandwidth having a downstream source.

FIG. 9 illustrates system 140 for estimating an effective bandwidth for service admission where the traffic source is a downstream source. Initially, a user or user agent requests a service, such as video streaming, from service provider 146. In an embodiment, network operator (NTO) 144 performs the effective bandwidth estimation. Admission control unit 142 looks up the corresponding effective bandwidth required to satisfy the QoS of downstream source 124 in database 136 by checking its traffic ID, and responds to NTO 144. QoS levels for a user equipment may be obtained through offline surveys or based on user complaints. When there is not sufficient capacity to support the QoS of this application, NTO 144 and service provider 146 try to negotiate a lower QoS, for example by increasing the target packet delay violation probability which in turn reduces the effective bandwidth required by the application. However, when there is sufficient capacity to support the QoS of this application, the service is granted, and service provider 146 requests that downstream source 124 generates traffic.

In another embodiment, NTO 144 and service provider 146 together perform effective bandwidth estimation. When an application request is sent by a user or user agent, service provider 146 checks its traffic ID and estimates the effective bandwidth. The service provider sends and estimates the effective bandwidth of this application. Then, NTO 144 looks up the traffic multiplexing gain based on the current traffic mix. The system then checks whether there is sufficient capacity to support the QoS of the application. When there is sufficient capacity, the source is admitted to the services, while when there is insufficient capacity, the system tires to negotiate a lower QoS.

Gateway nodes 128, which may be RAN gateways, record and report the traffic pattern and its traffic IDs to database 136. In an embodiment, database 136 resides in a gateway when the traffic management is performed by the RAN gateway. Alternately, database 136 may reside near a connectivity-as-a-service provider (CaaSP) when the traffic management involves multiple networks. Database 136 contains traffic patterns and effective bandwidth lookup tables. For upstream traffic, when the request is originated from a user equipment (UE) terminal, the service might be offered for free or at a low cost with little or no service guarantee. In return, the UE reports its source traffic pattern, which is then stored in database 136 to build database 136. The system signals the UE to report the traffic trace. For downstream traffic, traffic patterns might be recorded at a RAN gateway. Effective bandwidth estimation software 138 retrieves a copy of the traffic pattern, performs a traffic classification, and updates the effective bandwidth-outage performance curve.

Figure 10:
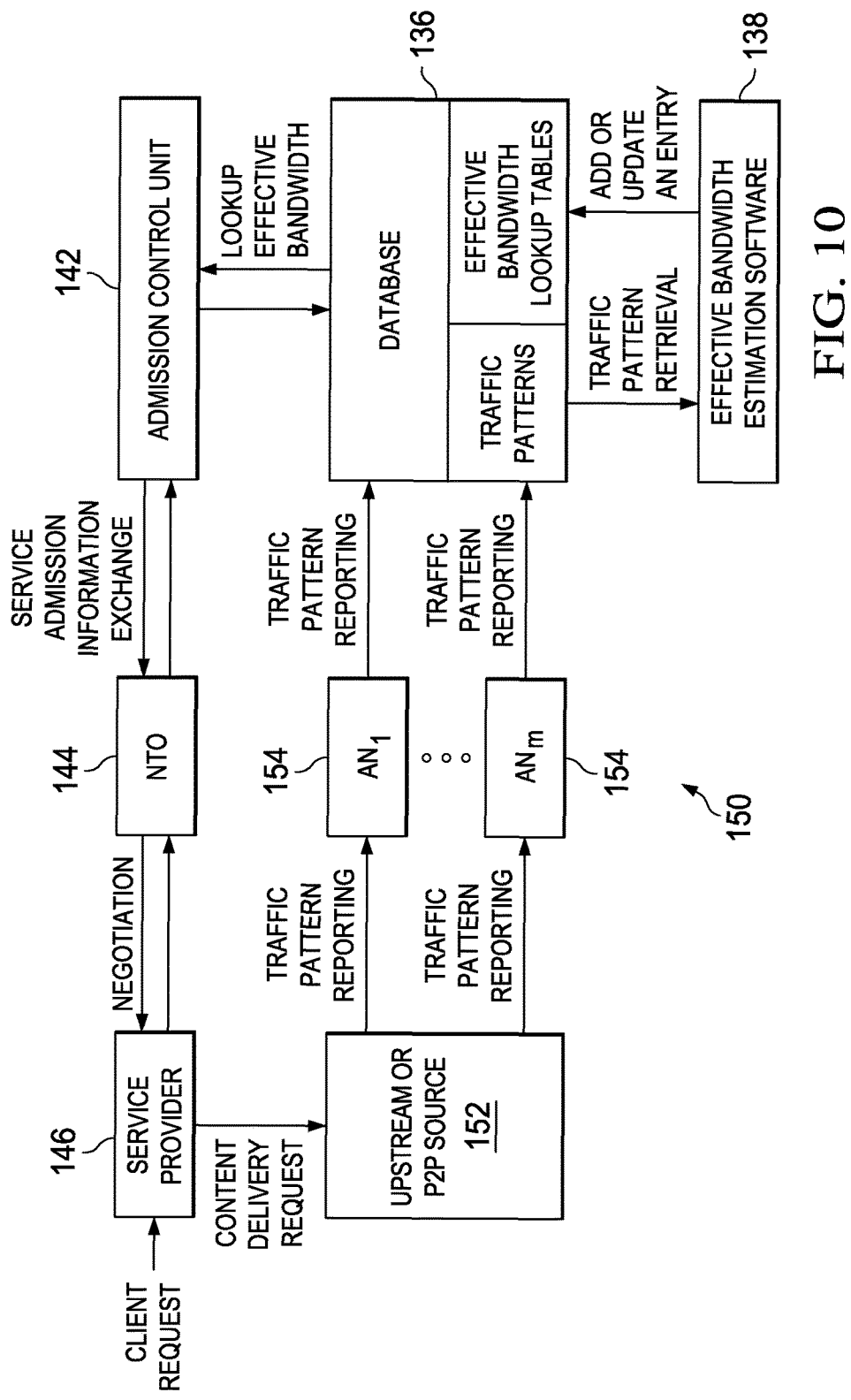
FIG. 10 illustrates another embodiment communications system for estimating an effective bandwidth having an upstream or peer-to-peer source.

FIG. 10 illustrates system 150 for estimating an effective bandwidth for service admission with an upstream or peer-to-peer (P2P) source. System 150 is similar to system 140. In both systems, a user or user equipment requests a service from service provider 146, admission control unit 142 looks up the corresponding effective bandwidth required to satisfy the QoS of downstream source 124 or upstream source or P2P source 152 in database 136 and responds to NTO 144, NTO 144 determines whether the system has sufficient capacity to meet the QoS target, and NTO 144 responds to service provider 146. However, in system 150, when the service is granted, service provider 146 requests that upstream source or P2P source 152 generates traffic. The client reports the traffic pattern to access nodes 154 and/or database 136. Access nodes 154, which may be RAN gateways, records and reports the traffic pattern and its traffic IDs to database 136. Effective bandwidth estimation software 138 retrieves a copy of the traffic pattern, performs a traffic classification, and updates the effective bandwidth-outage performance curve.

Figure 11:
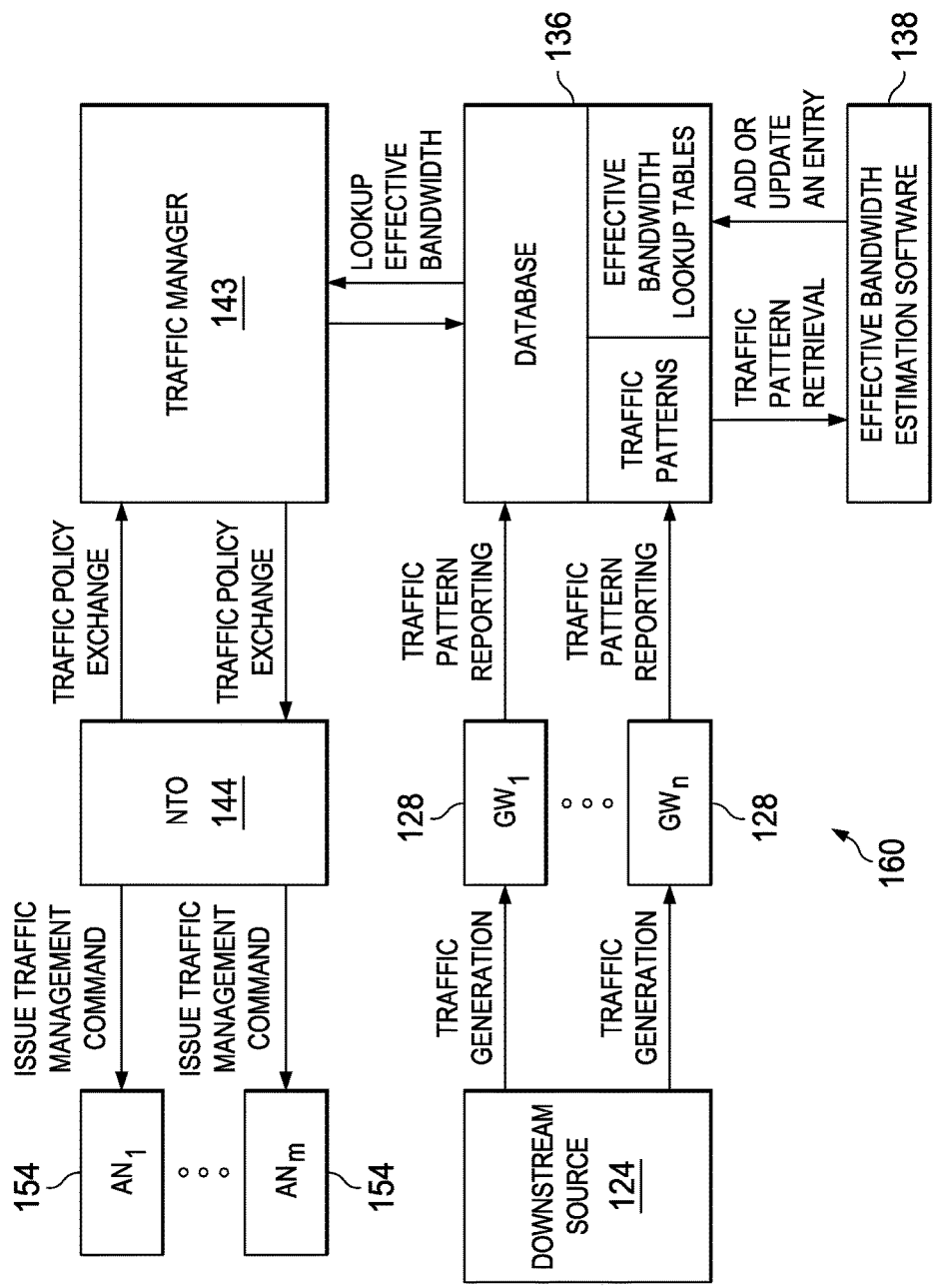
FIG. 11 illustrates another embodiment communications system for estimating an effective bandwidth having a downstream source.

FIG. 11 illustrates system 160 for estimating an effective bandwidth for traffic management where the traffic source is a downstream source. Traffic management or shaping may be achieved by a token bucket. NTO 144 determines whether the system has sufficient capacity to meet the QoS target by requesting that traffic manager 143 lookup the effective bandwidth in database 136. Next, NTO 144 issues traffic management commands to access nodes 154, and downstream source 124 generates data. Gateway nodes 128 records and reports the traffic pattern and its traffic IDs to database 136. Effective bandwidth estimation software 138 retrieves a copy of the traffic pattern, classifies the traffic, and updates the effective bandwidth-outage performance curve.

Figure 12:
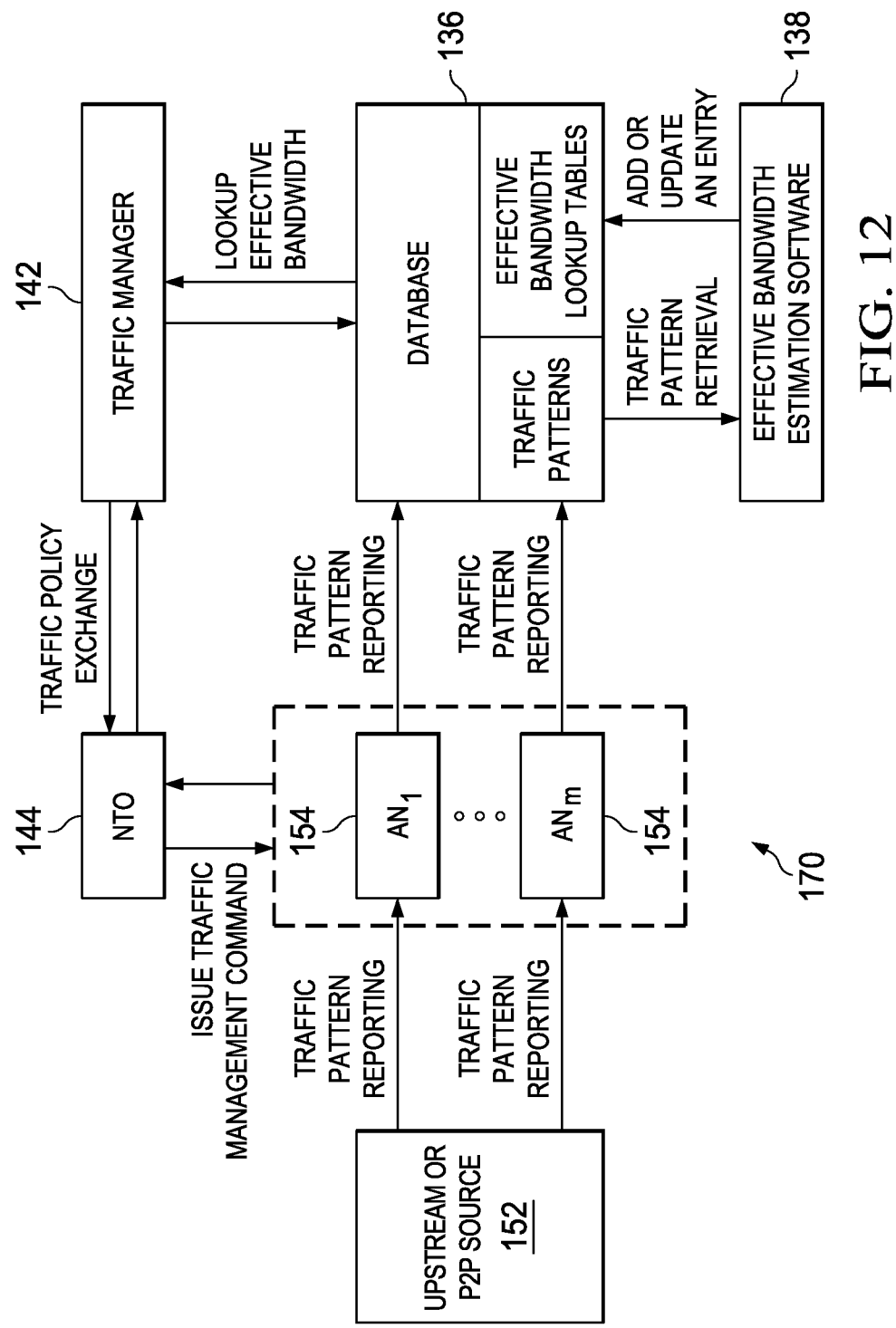
FIG. 12 illustrates another embodiment communications system for estimating an effective bandwidth having an upstream source or a peer-to-peer source.

Similarly, FIG. 12 illustrates system 170 for estimating an effective bandwidth for traffic management with an upstream source or P2P source. NTO 144 determines whether the system has sufficient capacity to meet the QoS target by requesting that traffic manager 143 lookup the effective bandwidth in database 136. NTO 144 issues traffic management commands to access nodes 154. Upstream or P2P source 152 generates data. Access nodes 154 record and report the traffic pattern and its traffic IDs to database 136. Effective bandwidth estimation software 138 retrieves a copy of the traffic pattern, classifies the traffic, and updates the effective bandwidth-outage performance curve.

Figure 13:
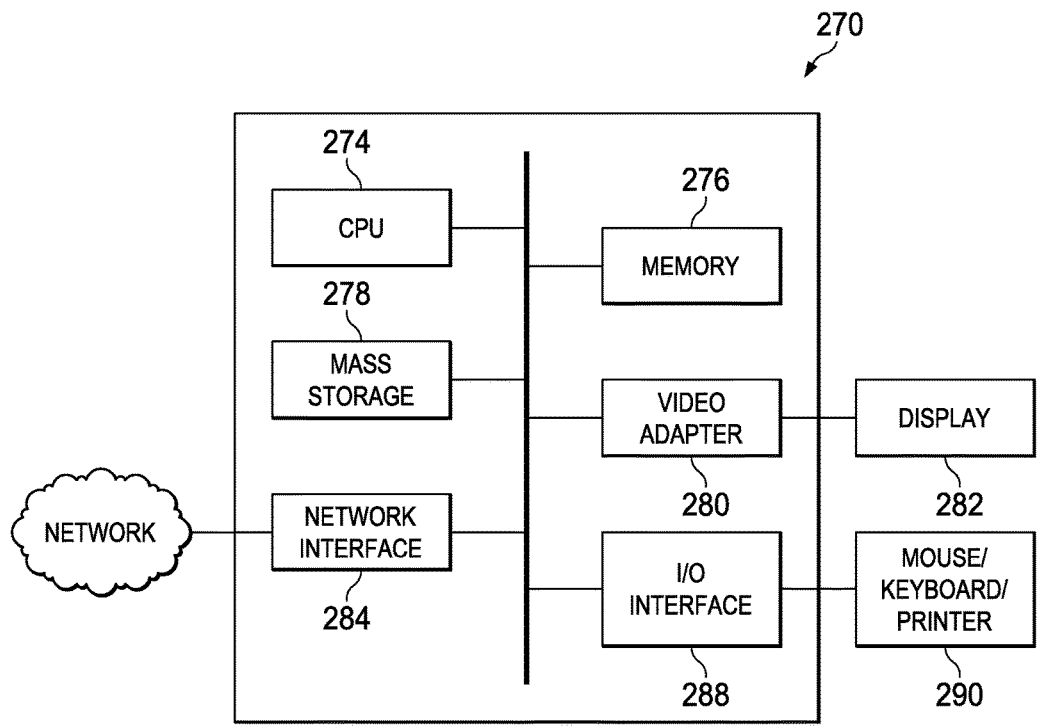
FIG. 13 illustrates a schematic diagram of an embodiment of a general-purpose computer system.

FIG. 13 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a localarea network or a wide-area network for data processing and communications with remote devices, such as other processing units, the Internet, remote storage facilities, or the like.

In another embodiment, a system may carry out evaluation of effective bandwidth for all possible combinations of traffic types, buffer sizes, scheduling types and other dependent parameters such as user types. The effective bandwidth of these combinations is then stored in a database. Once a known application request is received, the estimation of effective bandwidth may be performed by matching the application tag and user types. However, when an unknown application or traffic type is received, the traffic parameters are immediately measured, and a matching effective rate is obtained, as all the feasible combinations are stored in the database. Therefore, there is less need for online simulations, and consequently, a quick decision may be made.

Figure 14:
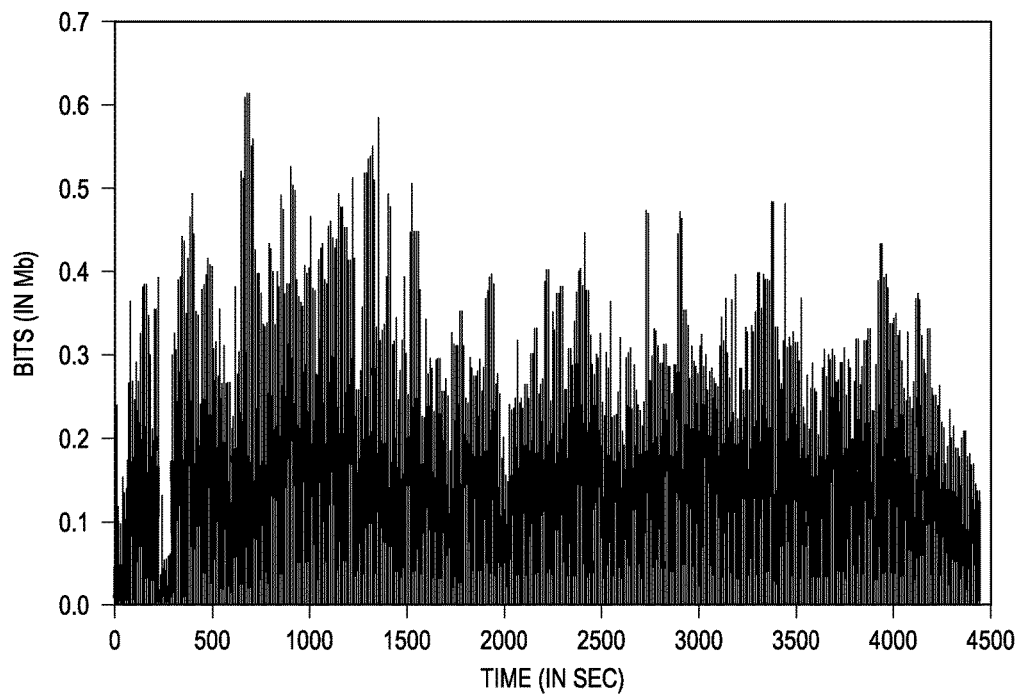
FIG. 14 illustrates a bits versus time graph for a traffic pattern.

FIG. 14 illustrates the bitrate for a real trace file of a video used to evaluate the performance of an embodiment system. To mimic multiple traffic sources, a random shift is introduced in the starting time of each traffic source. The simulation duration is 1000 s.

Figure 15:
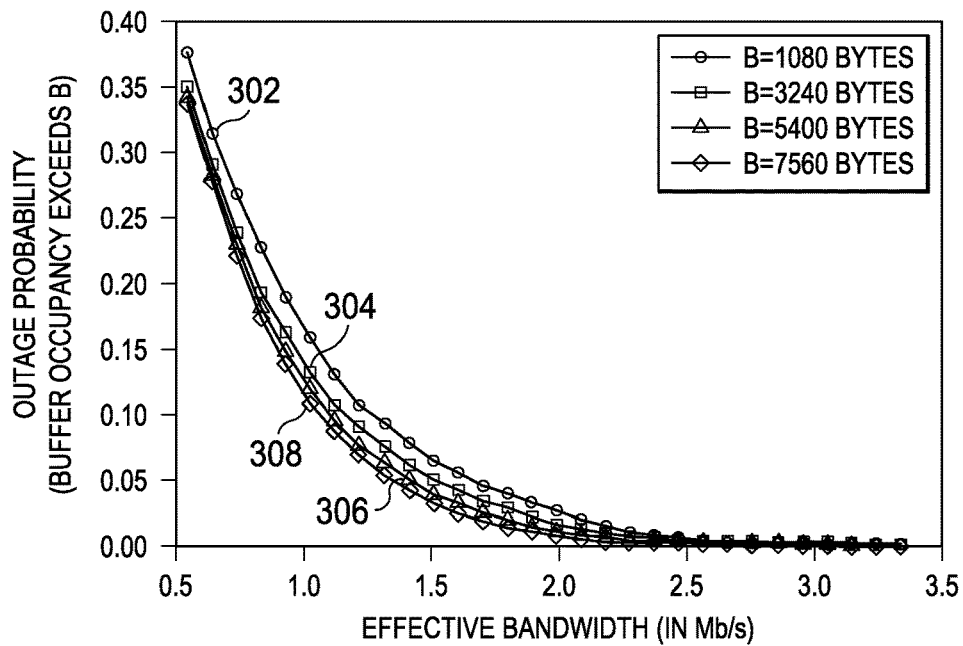
FIG. 15 illustrates an outage rate versus effective bandwidth graph for an embodiment system having one traffic source.

FIG. 15 illustrates a graph of an outage rate versus effective bandwidth for an embodiment system with a single traffic source. In obtaining the data, given a QoS target, a number of effective bandwidth and outage rate points are collected for a lookup table. The graphs include curve 302 is with buffer size of 1080 bytes, curve 304 is with buffer size of 3240 bytes, curve 306 is with buffer size of 5400 bytes, and curve 308 with a buffer size of 7560 bytes. These curves can be fitted to the data, where curves 302, 304, 306, and 308 resemble a power decay curve, which is consistent with the fundamental theory of effective bandwidth.

Figure 16:
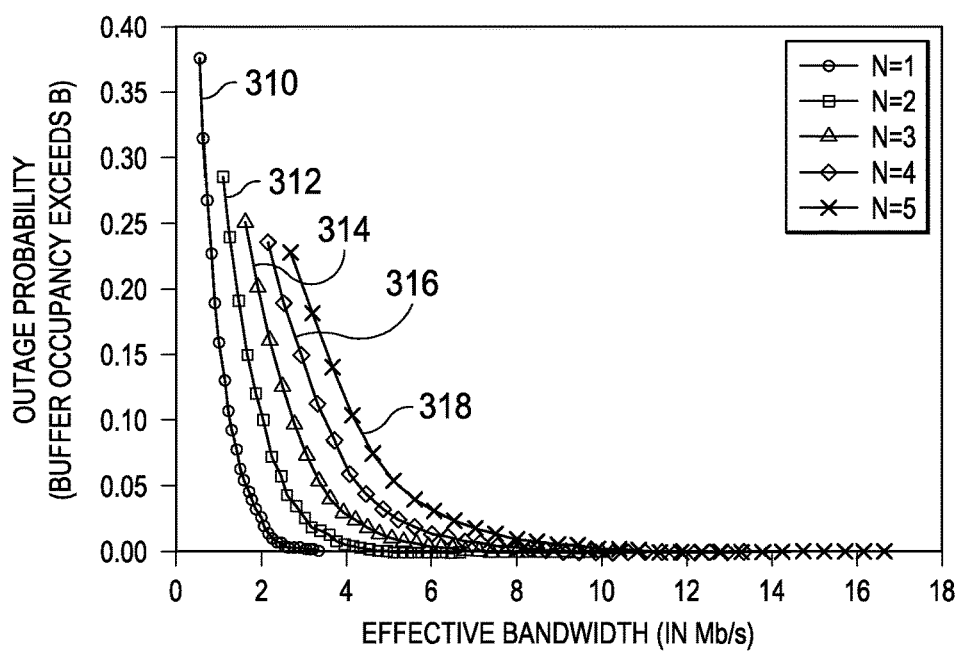
FIG. 16 illustrates an outage rate versus effective bandwidth graph for an embodiment system having multiple traffic sources.

FIG. 16 illustrates a graph of outage rate versus effective bandwidth for a system having multiple traffic sources. Given a QoS target, a number of effective bandwidth and outage rates are collected for the lookup table versus the number of traffic sources. Different traffic sources may have different QoS targets. Curve 310 illustrates one traffic source, curve 312 illustrates two traffic sources, curve 314 illustrates three traffic sources, curve 316 illustrates four traffic sources, and curve 318 illustrates five traffic sources. A curve fitting technique is used to obtain a required effective bandwidth for a traffic mix. The traffic multiplexing gain can be predicted using a curve fitting technique, where the traffic multiplexing gain is the sum of the effective bandwidth of the independent traffic sources minus the effective bandwidth of an aggregate traffic of the traffic sources.

Table 1 below illustrates the multiplexing gain based on the number of traffic sources for a simulation run at a 5% QoS outage rate with a buffer size of 1080 bytes. For one traffic source, the effective bandwidth of the aggregate traffic and the sum of the effective bandwidth of the traffic sources are both 1.66 Mb/s, with a multiplexing gain of zero, because there is no multiplexing gain when there is only one traffic source. However, for two traffic sources, the effective bandwidth of an aggregate traffic is 2.55 Mb/s, the sum of the effective bandwidth of the independent traffic sources is 3.32 Mb/s, and the multiplexing gain is 0.77 Mb/s. Also, for three traffic sources, the effective bandwidth of the aggregate traffic is 3.47 Mb/s, the sum of the effective bandwidth of the independent traffic sources is 4.98 Mb/s, and the multiplexing gain is 1.51 Mb/s (i.e., additional multiplexing gain is 0.74 Mb/s). Similarly, for four traffic sources, the effective bandwidth of an aggregate traffic of the traffic sources is 4.35 Mb/s, the sum of the effective bandwidth of the independent traffic sources is 6.64 Mb/s, and the multiplexing gain is 2.29 Mb/s (i.e., the additional multiplexing gain is 0.78 Mb/s). Additionally, for five traffic sources, the effective bandwidth of the aggregate traffic is 5.28 Mb/s, the sum of the effective bandwidth of the independent traffic sources is 8.30 Mb/s, and the multiplexing gain is 3.02 Mb/s (i.e., the additional multiplexing gain is 0.73 Mb/s).

TABLE 1

| Multiplexing Gain | | | | | |
|---|---|---|---|---|---|
| N | 1 | 2 | 3 | 4 | 5 |
| Effective bandwidth of an aggregate traffic of N sources (in Mb/s) | 1.66 | 2.55 | 3.47 | 4.35 | 5.28 |
| Summation of effective bandwidth of N independent traffic sources (in Mb/s) | 1.66 | 3.32 | 4.98 | 6.64 | 8.30 |
| Traffic multiplexing gain (in Mb/s) | 0 | 0.77 | 1.51 | 2.29 | 3.02 |
| Additional traffic multiplexing gain (in Mb/s) | 0 | 0.77 | 0.74 | 0.78 | 0.73 |

Figure 17:
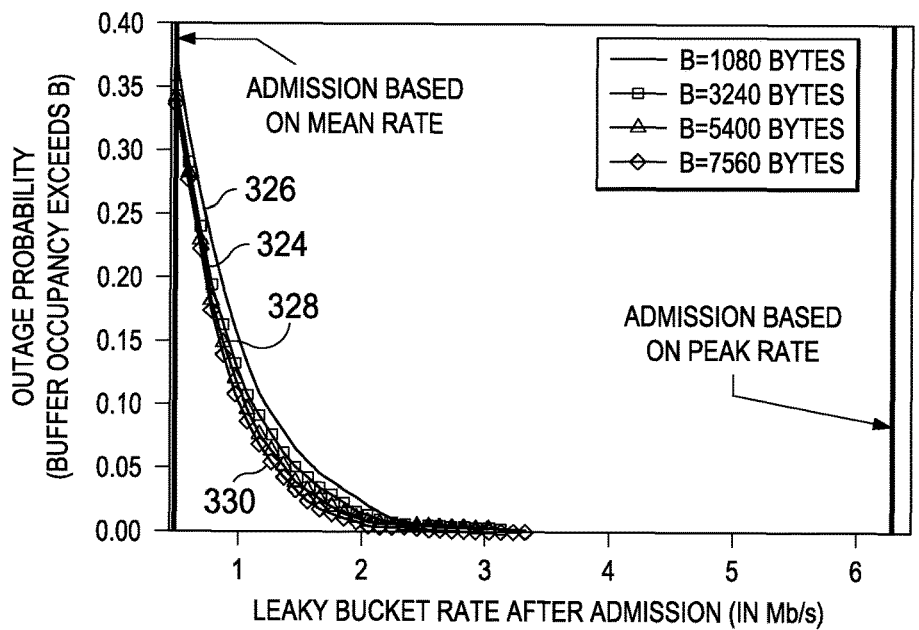
FIG. 17 illustrates an outage rate versus leaky bucket rate after admission graph for an embodiment system having one traffic source.

FIG. 17 illustrates the outage rate versus the leaky bucket rate after admission for an embodiment system having a single traffic source. The mean data rate is 0.545 Mb/s and the peak data rate is 6.38 Mb/s. Curve 324 illustrates the curve for a buffer of 1080 bytes, curve 326 illustrates the curve for a buffer of 3240 bytes, curve 328 illustrates the curve for a buffer of 5400 bytes, and curve 330 illustrates the curve for a buffer of 7560 bytes. Admission based on the mean data rate of this traffic source gives more than a 30% outage. Although admission based on the peak data rate provides a 0% outage rate, it requires significantly more resources than the effective bandwidth based approach.

Figure 18:
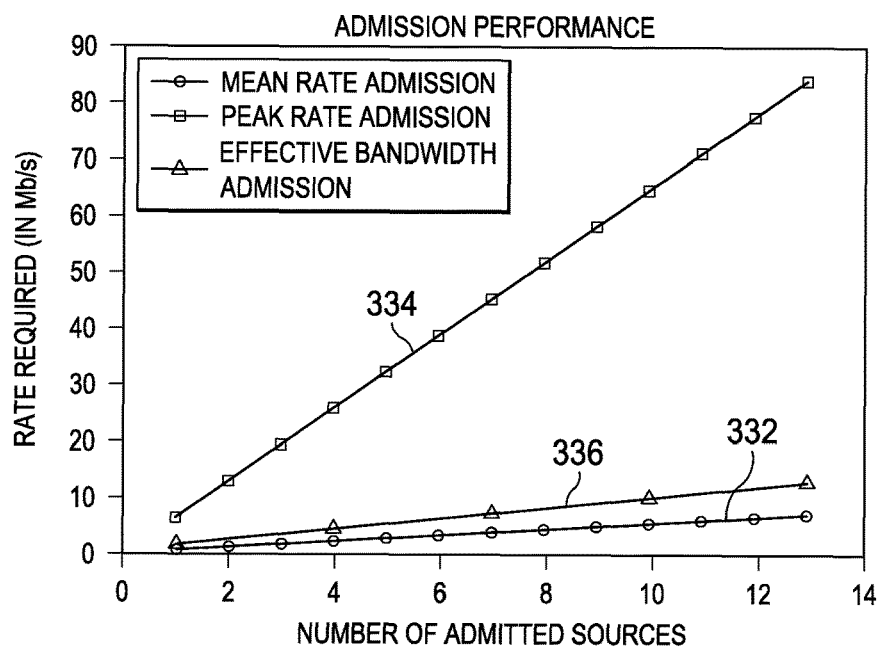
FIG. 18 illustrates an admission rate versus number of admitted sources graph for an embodiment system.

FIG. 18 illustrates the rate required versus the number of admitted sources for a system having multiple traffic sources. Curve 332 illustrates the mean data rate, curve 334 illustrates the peak data rate, and curve 336 illustrates the effective bandwidth rate. Assuming a fixed system throughput, the effective bandwidth data rate can admit significantly more traffic sources compared to the peak data rate. The effective bandwidth approach can admit over five times as many traffic sources as an approach using the peak data rate. Although an approach using the mean data rate admits more traffic sources than the effective bandwidth approach, the QoS target of the traffic sources cannot be met or controlled.

Figure 19:
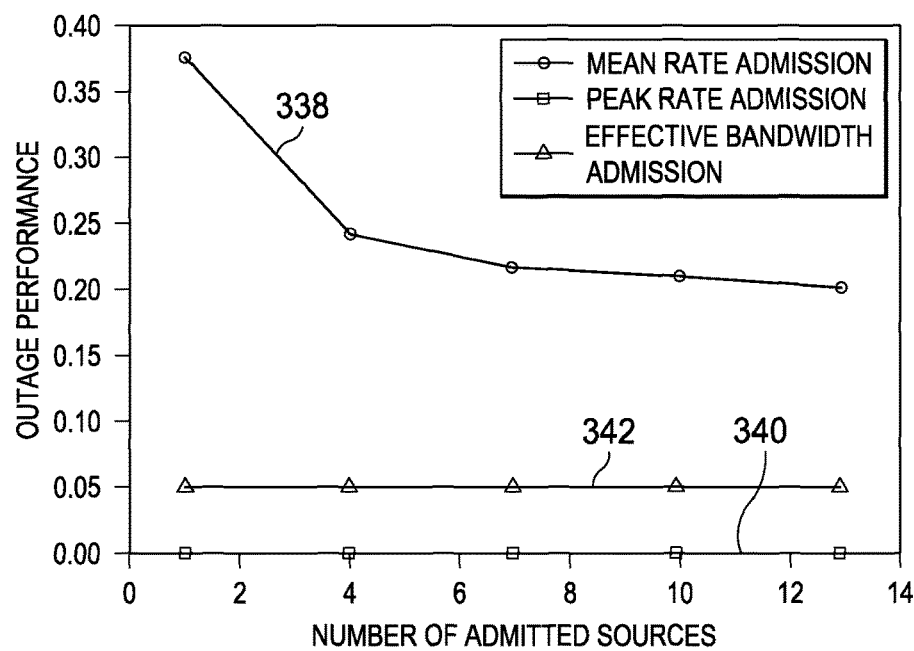
FIG. 19 illustrates an outage rate versus number of admitted sources graph for an embodiment system.

FIG. 19 illustrates the outage rate versus the number of admitted sources, where curve 338 illustrates the mean data rate, curve 340 illustrates the peak data rate, and curve 342 illustrates the effective bandwidth rate. Using the peak data rate, there is no outage expected, but it is overly conservative. Although the QoS outage rate using the mean data rate decreases as the number of traffic sources increases due to traffic multiplexing gain, the QoS target cannot be satisfied for an arbitrary number of traffic sources. In contrast, the admission performance can be enhanced using the effective bandwidth approach.

Figure 20:
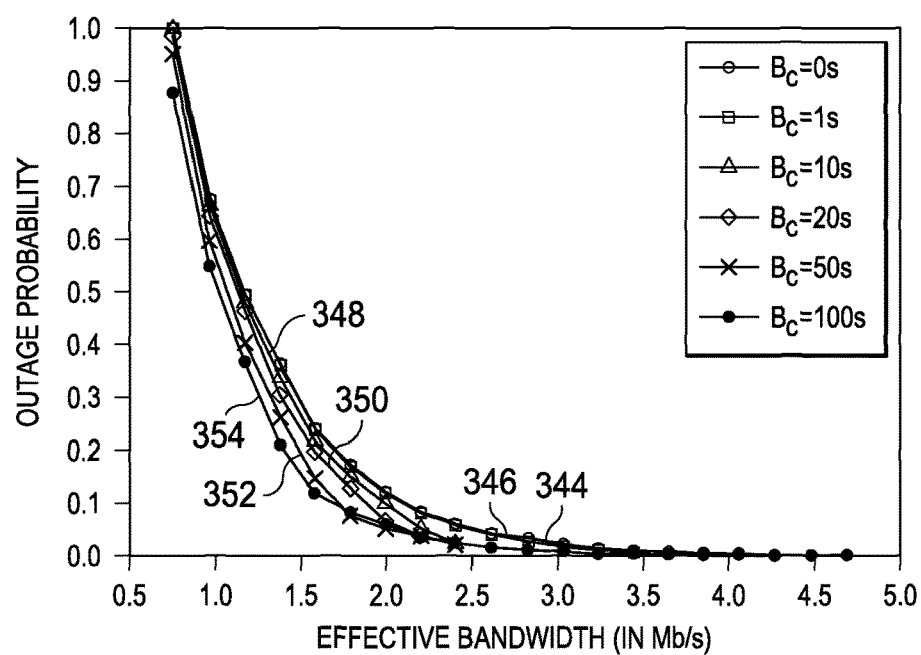
FIG. 20 illustrates an outage rate versus effective bandwidth graph for an embodiment system in the presence of a playback buffer.

FIG. 20 illustrates outage rate versus effective bandwidth in the presence of a playback buffer for different client buffer sizes given a fixed QoS target at the source, a fixed source buffer size of 1080, and a fixed mean playback rate at the client of 758 kb/s. The outage rate includes outages due to source buffer overflow and re-buffering at the playback. Curve 344 illustrates the outage rate for an initial client buffer size of 0 s, curve 346 illustrates the outage rate for an initial client buffer size of 1 s, curve 348 illustrates the outage rate for an initial client buffer size of 10 s, curve 350 illustrates the outage rate for an initial client buffer size of 20 s, curve 352 illustrates the outage rate for an initial client buffer size of 50 s, and curve 354 illustrates the outage rate for an initial client buffer size of 100 s.

Table 2 below summarizes key trends for effective bandwidth estimation in the presence of a client playback buffer. For an initial client buffer size of 0 s, the effective bandwidth is 2.55 Mb/s for a 5% outage rate, the effective bandwidth is 2.13 Mb/s for an outage rate of 10%, and the effective bandwidth is 1.71 Mb/s for an outage rate of 20%. However, for an initial client buffer size of 1 s, the effective bandwidth is 2.50 Mb/s for an outage rate of 5%, the effective bandwidth is 2.11 Mb/s for an outage rate of 10%, and the effective bandwidth is 1.70 Mb/s for an outage rate of 20%. Also, for an initial client buffer size of 10 s, the effective bandwidth is 2.20 Mb/s for an outage rate of 5%, the effective bandwidth is 2.00 Mb/s for an outage rate of 10%, and the effective bandwidth is 1.64 Mb/s for an outage rate of 20%. Additionally, for an initial client buffer size of 20 s, the effective bandwidth is 2.10 Mb/s for an outage rate of 5%, the effective bandwidth is 1.90 Mb/s for an outage rate of 10%, and the effective bandwidth is 1.59 Mb/s for an outage rate of 20%. For an initial client buffer size of 50 s, the effective bandwidth is 2.10 Mb/s for an outage rate of 5%, the effective bandwidth is 1.73 for an outage rate of 10%, and the effective bandwidth is 1.49 Mb/s for an outage rate of 20%. Also, for an initial client buffer size of 100 s, the effective bandwidth is 2.10 Mb/s for an outage rate of 5%, the effective bandwidth is 1.70 Mb/s for an outage rate of 10%, and the effective bandwidth is 1.41 for an outage rate of 20%.

TABLE 2

Effective Bandwidth in the Presence of a Client Playback Buffer

| Effective bandwidth required (in Mb/s) | | Client buffer size (in seconds) | | | | | |
|---|---|---|---|---|---|---|---|
| | | 0 | 1 | 10 | 20 | 50 | 100 |
| outage rate | 5% | 2.55 | 2.50 | 2.20 | 2.10 | 2.10 | 2.10 |
| | 10% | 2.13 | 2.11 | 2.00 | 1.90 | 1.73 | 1.70 |
| | 20% | 1.71 | 1.70 | 1.64 | 1.59 | 1.49 | 1.41 |

Figure 21:
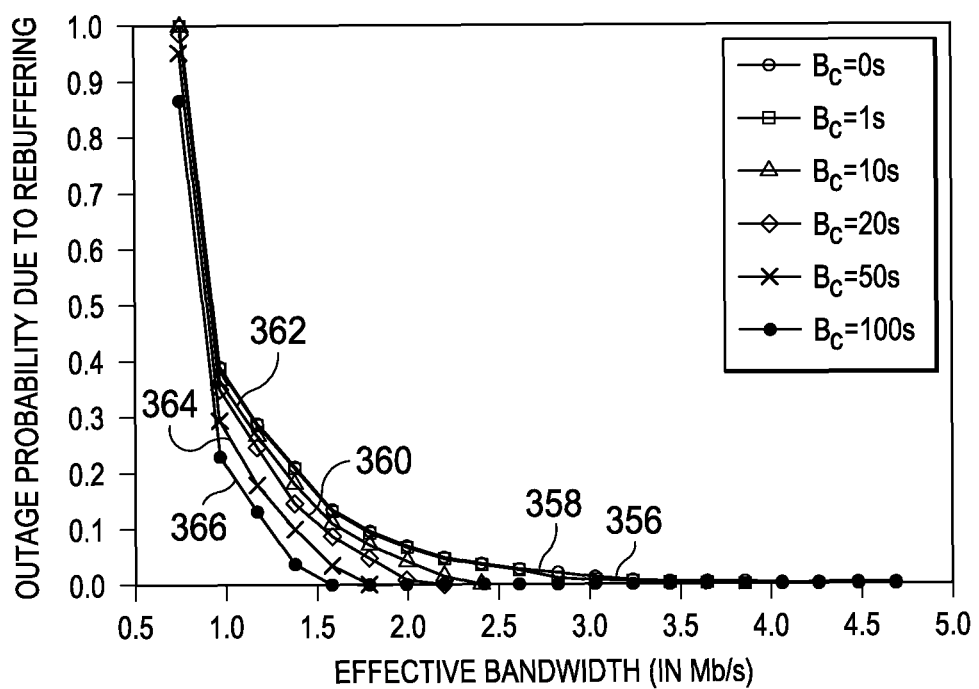
FIG. 21 illustrates an outage rate versus effective bandwidth graph for an embodiment system in the presence of a playback buffer.

FIG. 21 illustrates a graph of outage rate due to re-buffering at the client side alone. The larger the size of an initial client playback buffer, the lower the outage rate due to re-buffering. Curve 356 illustrates the outage rate for a buffer of 0 s, curve 358 illustrates the outage rate for an initial client buffer size of 1 s, curve 360 illustrates the outage rate for an initial client buffer size of 10 s, curve 362 illustrates the outage rate for an initial client buffer size of 20 s, curve 364 illustrates the outage rate for an initial client buffer size of 50 s, and curve 366 illustrates the outage rate for an initial client buffer size of 100 s. As the size of the client playback buffer increases, the effective bandwidth required to satisfy the traffic QoS decreases. However, there is generally a diminishing return in the reduction of effective bandwidth required per each unit increase in the size of an initial client playback buffer size.

Advantages include an embodiment capturing the traffic multiplexing gain. As the number of traffic sources increases, traffic multiplexing gains can play an increasingly important role in the aggregate traffic requirement. Also, an embodiment includes the ability to capture the effect of a playback buffer the client side. Another advantage of an embodiment includes the ability to admit more satisfied users to increase revenue. Traffic management may also permit the shaping of traffic to achieve a certain objective, such as load balancing or congestion control.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of effective bandwidth estimation, the method comprising:
    obtaining a first traffic pattern of a first traffic source from the first traffic source;
    setting a first effective bandwidth between a mean data rate of the first traffic source and a peak data rate of the first traffic source;
    determining a first real time outage rate of the first traffic source in accordance with the first traffic pattern of the first traffic source and the first effective bandwidth; and
    calculating a multiplexing gain comprising comparing the first effective bandwidth, a second effective bandwidth of a second traffic source, and a third effective bandwidth of a traffic mix, wherein the traffic mix comprises traffic from the first traffic source and traffic from the second traffic source.

2. The method of claim 1, further comprising adjusting the first effective bandwidth by a backoff margin.

3. The method of claim 2, further comprising calculating the backoff margin in accordance with real-time data feedback.

4. The method of claim 3, wherein the real-time data feedback comprises instantaneous traffic arrivals.

5. The method of claim 1, further comprising:
    recording a trace of the first traffic pattern; and
    determining whether the first traffic pattern is a match to a previously recorded traffic pattern.

6. The method of claim 5, wherein determining whether the first traffic pattern is a match to the previously recorded traffic pattern is performed in accordance with traffic statistics.

7. The method of claim 6, wherein the traffic statistics comprise a mean data rate, a peak data rate, and an autocorrelation.

8. The method of claim 5, wherein determining whether the first traffic pattern is a match to the previously recorded traffic pattern comprises determining whether an application tag of the first traffic pattern matches an application tag of the previously recorded traffic pattern.

9. The method of claim 5, wherein determining whether the first traffic pattern is a match to the previously recorded traffic pattern comprises identifying features in the first traffic pattern that are similar to features in the previously recorded traffic pattern.

10. The method of claim 5, wherein determining whether the first traffic pattern is a match to the previously recorded traffic pattern comprises performing deep packet inspection on the first traffic pattern.

11. The method of claim 5, wherein determining whether the first traffic pattern is a match to the previously recorded traffic pattern comprises:
assigning a traffic ID to the first traffic pattern; and
comparing the traffic ID of the first traffic pattern to a traffic ID of the previously recorded traffic pattern.

12. The method of claim 5, wherein determining whether the first traffic pattern is a match to the previously recorded traffic pattern comprises comparing statistics of the first traffic pattern to statistics of the previously recorded traffic pattern.

13. The method of claim 5, wherein recording the trace of the first traffic pattern comprises recording a type of a packet, a number of bits of the packet, and a timestamp for the packet for packets in the first traffic pattern.

14. The method of claim 5, wherein recording the trace of the first traffic pattern comprises recording an average bit rate of the first traffic pattern.

15. The method of claim 5, wherein recording the trace of the first traffic pattern comprises recording a weighted average bit rate of the first traffic pattern.

16. The method of claim 1, wherein determining the first real time outage rate of the first traffic source comprises:
receiving a first traffic stream from the first traffic source at a data rate of the first effective bandwidth;
measuring the first real time outage rate for the first traffic stream; and
recording the first real time outage rate.

17. The method of claim 16, further comprising:
adjusting the first effective bandwidth in accordance with the first real time outage rate to produce an adjusted effective bandwidth;
generating a second traffic stream by the first traffic source;
measuring a second real time outage rate for the second traffic stream; and
recording the adjusted effective bandwidth and the second real time outage rate.

18. The method of claim 17, further comprising fitting a curve to the first real time outage rate, the second real time outage rate, and the first effective bandwidth.

19. The method of claim 1, further comprising:
selecting a playback rate; and
determining a size of a playback buffer.

20. The method of claim 1, further comprising:
obtaining a plurality of traffic patterns from a plurality of traffic sources;
determining a plurality of outage rates of the plurality of traffic sources in accordance with the plurality of traffic patterns and the first effective bandwidth; and
storing the plurality of outage rates.

21. The method of claim 1, further comprising:
estimating the second effective bandwidth of the second traffic source; and
estimating the third effective bandwidth of the traffic mix.

22. The method of claim 21, further comprising estimating a fourth effective bandwidth of a third traffic source, wherein the traffic mix further comprises traffic from the third traffic source.

23. The method of claim 22, further comprising estimating a plurality of effective bandwidths of a plurality of traffic sources, wherein the traffic mix further comprises traffic from the plurality of traffic sources.

24. The method of claim 23, wherein estimating the third effective bandwidth of the traffic mix comprises scheduling packets of the traffic mix.

25. The method of claim 23, wherein estimating the third effective bandwidth of the traffic mix comprises:
obtaining an effective bandwidth of the traffic mix, wherein the effective bandwidth of the traffic mix is greater than a sum of a mean data rate of the first traffic source and a mean data rate of the second traffic source, and wherein the effective bandwidth is less than a sum of a peak data rate of the first traffic source and a peak data rate of the second traffic source;
obtaining a second traffic pattern of the second traffic source;
determining the first real time outage rate of the traffic mix in accordance with the first traffic pattern of the first traffic source and the second traffic pattern of the second traffic source;
recording the effective bandwidth of the traffic mix; and
recording the first real time outage rate of the traffic mix.

26. The method of claim 25, further comprising:
adjusting the effective bandwidth of the traffic mix in accordance with the first real time outage rate of the traffic mix;
obtaining a third traffic pattern of the first traffic source;
obtaining a fourth traffic pattern of the second traffic source;
determining a second outage rate of the traffic mix in accordance with the third traffic pattern of the first traffic source and the fourth traffic pattern of the second traffic source;
recording the adjusted effective bandwidth of the traffic mix; and
recording the second outage rate of the traffic mix.

27. A gateway comprising:
a processor; and
a non-transitory computer readable storage medium storing programming for execution by the processor, the programming including instructions to
obtain a traffic pattern of a first traffic source from the first traffic source,
set a first effective bandwidth between a mean data rate of the first traffic source and a peak data rate of the first traffic source,
determine a real time outage rate of the first traffic source in accordance with the traffic pattern of the first traffic source and the first effective bandwidth, and
calculate a multiplexing gain comprising comparing the first effective bandwidth, a second effective bandwidth of a second traffic source, and a third effective bandwidth of a traffic mix, wherein the traffic mix comprises traffic from the first traffic source and traffic from the second traffic source.

* * * * *